(12) United States Patent
Kobayashi et al.

(10) Patent No.: US 12,516,645 B2
(45) Date of Patent: Jan. 6, 2026

(54) DIESEL ENGINE

(71) Applicant: KUBOTA CORPORATION, Osaka (JP)

(72) Inventors: Yasushi Kobayashi, Sakai (JP); Naotaro Nagai, Sakai (JP); Rina Kaneko, Sakai (JP); Masanari Tennomi, Sakai (JP); Naruhiro Matsuo, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 18/717,543

(22) PCT Filed: Aug. 29, 2022

(86) PCT No.: PCT/JP2022/032402
§ 371 (c)(1),
(2) Date: Jun. 7, 2024

(87) PCT Pub. No.: WO2023/105860
PCT Pub. Date: Jun. 15, 2023

(65) Prior Publication Data
US 2025/0020088 A1    Jan. 16, 2025

(30) Foreign Application Priority Data

Dec. 10, 2021 (JP) ................................ 2021-200944

(51) Int. Cl.
*F02D 41/40* (2006.01)
*F02B 3/06* (2006.01)
*F02B 19/08* (2006.01)

(52) U.S. Cl.
CPC .............. *F02D 41/403* (2013.01); *F02B 3/06* (2013.01); *F02B 19/08* (2013.01)

(58) Field of Classification Search
CPC .. F02D 41/403; F02D 41/3035; F02D 41/402; F02D 41/40; F02D 41/405;
(Continued)

(56) References Cited

U.S. PATENT DOCUMENTS 5,081,970 A * 1/1992 Matsuoka ............... F02B 19/08
123/275
2010/0242899 A1 * 9/2010 Hitomi ................. F02D 41/3035
123/305

(Continued)

FOREIGN PATENT DOCUMENTS

EP          0420641 B1    11/1993
JP          S61-112725     5/1986
(Continued)

*Primary Examiner* — Xiao En Mo
(74) *Attorney, Agent, or Firm* — Muncy, Geissler, Olds & Lowe, P.C.

(57) ABSTRACT

A diesel engine 1 includes: an injector 15; a control device which controls an injection timing of fuel 81 injected from the injector 15; and exhaust circulating means. The control device controls the injection timing of main injection and pre-injection performed prior to the main injection and executes control such that, by ensuring a premixing period of the pre-injection from start of the pre-injection until ignition of an air-fuel mixture of the fuel 81 injected by the pre-injection and the air AR, a homogenous and lean premixed air-fuel mixture is generated in the auxiliary combustion chamber 13 by the fuel 81 injected by the pre-injection and air AR, and the premixing period of the main injection from the start of the main injection until ignition of the air-fuel mixture of the fuel 81 injected by the main injection and the air AR is ensured.

8 Claims, 7 Drawing Sheets

(58) Field of Classification Search
CPC .. F02D 45/00; F02B 3/06; F02B 19/08; F02B 1/12; F02B 19/14
See application file for complete search history.

(56) References Cited

U.S. PATENT DOCUMENTS

| | | | | |
|---|---|---|---|---|
| 2011/0067679 A1* | 3/2011 | Hitomi | ............ | F02D 41/402 |
| | | | | 123/564 |
| 2013/0179050 A1* | 7/2013 | Munshi | ............ | B60T 1/06 |
| | | | | 701/104 |
| 2014/0000557 A1* | 1/2014 | Glugla | ............ | F02D 41/008 |
| | | | | 123/434 |

FOREIGN PATENT DOCUMENTS

| | | |
|---|---|---|
| JP | H03-115724 | 5/1991 |
| JP | H06-307246 A | 11/1994 |
| JP | 2005-69042 | 3/2005 |
| JP | 4075588 | 4/2008 |

* cited by examiner

DIESEL ENGINE

TECHNICAL FIELD

The present invention relates to an auxiliary-chamber type diesel engine which injects fuel into an auxiliary combustion chamber.

BACKGROUND ART

The Patent Literature 1 discloses a direct-injection type diesel engine which directly injects fuel into a cylinder. In the diesel engine disclosed in the Patent Literature 1, fuel-injection control means performs early injection of a relatively small amount during a compression stroke in plural times and also performs main injection of a relatively large amount after elapse of a predetermined period since completion of the early injection. Moreover, the fuel-injection control means performs initial early injection at a timing of 80° BTDC and after and of 40° BTDC and before.

Here, it is known that NOx can be reduced by introducing EGR (Exhaust Gas Recirculation). However, if the EGR is introduced, oxygen concentration of air sucked into the cylinder becomes lower than that in a case where the EGR is not introduced and thus, there is such a concern that ignition of fuel becomes difficult or a misfire occurs. On the other hand, it is known that performance of pilot injection prior to the main injection is effective.

However, if the pilot injection is performed prior to the main injection, the fuel injected by the pilot injection is combusted, whereby a pressure and a temperature in the cylinder rise. Then, a premixing period of the fuel injected by the main injection and air becomes shorter than that in a case where the pilot injection is not performed. Thus, there is a problem in that a generation amount of particulate matter (PM) such as soot increases when the fuel injected by the main injection is combusted. Moreover, due to the rise in a pressure in the cylinder by a combustion gas that is generated when the fuel injected by the pilot injection is combusted, a force in a direction against the rise of the piston acts on the piston. Then, illustrated thermal efficiency deteriorates, and fuel efficiency deteriorates. Thus, excess fuel is injected in the main injection, and unburned fuel is discharged as PM, which is a problem.

As described above, in the diesel engine, the reduction of NOx and the reduction of PM are in a trade-off relation, and there is a problem in that the reduction of NOx and the reduction of PM cannot be easily realized at the same time.

CITATION LIST

Patent Literature

[PTL 1] Japanese Patent No. 4075588

SUMMARY OF INVENTION

Technical Problem

The present invention has been made in view of the aforementioned circumstances and has an object to provide a diesel engine which can realize reduction of NOx and reduction of PM at the same time.

Solution to Problem

The aforementioned problem is solved by a diesel engine according to the present invention, having a main combustion chamber and an auxiliary combustion chamber communicating with the main combustion chamber, the diesel engine including an injector which is provided facing the auxiliary combustion chamber and injects fuel into the auxiliary combustion chamber, a control device which controls an injection timing of the fuel injected from the injector, and exhaust circulating means that circulates exhaust of an engine, wherein the control device controls the injection timing of main injection and pre-injection performed prior to the main injection and executes control such that, by ensuring a premixing period of the pre-injection from start of the pre-injection until ignition of an air-fuel mixture of the fuel injected by the pre-injection and air, a homogenous and lean premixed air-fuel mixture is generated in the auxiliary combustion chamber by the fuel injected by the pre-injection and the air, and the premixing period of the main injection from the start of the main injection until ignition of the air-fuel mixture of the fuel injected by the main injection and the air is ensured.

According to the diesel engine according to the present invention, the control device controls the injection timings of the main injection and the pre-injection performed prior to the main injection and executes control such that the homogenous and lean premixed air-fuel mixture is generated in the auxiliary combustion chamber by the fuel injected by the pre-injection and the air by ensuring the premixing period of the pre-injection from the start of the pre-injection until ignition of the air-fuel mixture of the fuel injected by the pre-injection and the air. As described above, the control device ensures the premixing period of the pre-injection from the start of the pre-injection until ignition of the air-fuel mixture of the fuel injected by the pre-injection and the air, by expediting the injection timing of the pre-injection very much to such a degree that the homogenous and lean premixed air-fuel mixture can be generated in the auxiliary combustion chamber. Thus, combustion by the pre-injection can be realized as PCCI (Premixed Charge Compression Ignition) combustion. Therefore, rises of a pressure in a cylinder and a temperature in a cylinder when the fuel injected by the pre-injection is combusted can be suppressed, and a peak of a heat generation rate generated by the pre-injection can be kept low. As a result, the control device can also prolong the premixing period of the main injection by executing the control of ensuring the premixing period from the start of the main injection until ignition of the air-fuel mixture of the fuel injected by the main injection and air. Therefore, generation of PM can be suppressed. As a result, the diesel engine according to the present invention can realize the reduction of NOx and the reduction of the PM caused by introduction of the exhaust circulating means at the same time.

In the diesel engine according to the present invention, it is preferably characterized in that the injection timing of the main injection is a timing after the peak of the heat generation rate generated by the pre-injection and before a top dead center in a compression stroke.

According to the diesel engine according to the present invention, the injector starts the main injection after the peak of the heat generation rate generated by the pre-injection and before the top dead center in the compression stroke. Therefore, a longer premixing period of the main injection can be ensured. As a result, the diesel engine according to the present invention can realize the reduction of NOx and the reduction of PM by introduction of the exhaust circulating means more reliably at the same time.

In the diesel engine according to the present invention, it is preferably characterized in that the timing of ignition of the air-fuel mixture of the fuel injected by the main injection and the air is at the top dead center and after the top dead center in the compression stroke.

According to the diesel engine according to the present invention, the timing of ignition of the air-fuel mixture of the fuel injected by the main injection and the air is at the top dead center and after the top dead center in the compression stroke. Thus, a longer premixing period of the main injection can be ensured. As a result, the diesel engine according to the present invention can realize the reduction of NOx and the reduction of PM by introduction of the exhaust circulating means more reliably at the same time.

In the diesel engine according to the present invention, it is preferably characterized in that the injection timing of the pre-injection is a timing at which a crank angle is 60° or more and 120° or less before the top dead center in the compression stroke.

According to the diesel engine according to the present invention, the injection timing of the pre-injection is the timing at which the crank angle is 60° or more and 120° or less before the top dead center in the compression stroke. That is, the control device sets the timing when the crank angle is 60° or more and 120° or less before the top dead center in the compression stroke as the injection timing of the pre-injection. Thus, the control device can ensure the sufficient premixing period from the start of the pre-injection until ignition of the air-fuel mixture of the fuel injected by the pre-injection and air, and such a control can be executed that a homogenous and lean premixed air-fuel mixture is generated by the fuel injected by the pre-injection and the air in the auxiliary combustion chamber. Thus, the combustion by the pre-injection can be realized more reliably as the PCCI combustion, and the rises of the in-cylinder pressure and the in-cylinder temperature can be further suppressed. As a result, in the diesel engine according to the present invention, the reduction of NOx and the reduction of PM by the introduction of the exhaust circulating means can be realized more reliably at the same time.

In the diesel engine according to the present invention, it is preferably characterized in that the injection timing of the pre-injection is the timing at which a crank angle is 80° or more and 120° or less before the top dead center in the compression stroke.

According to the diesel engine according to the present invention, the injection timing of the pre-injection is the timing at which a crank angle is 80° or more and 120° or less before the top dead center in the compression stroke. That is, the control device sets the timing at which the crank angle is 80° or more and 120° or less before the top dead center in the compression stroke as the injection timing of the pre-injection. Thus, the control device can ensure the sufficient premixing period from the start of the pre-injection until ignition of the air-fuel mixture of the fuel injected by the pre-injection and air, and such a control can be executed that a homogenous and lean premixed air-fuel mixture is generated by the fuel injected by the pre-injection and the air in the auxiliary combustion chamber. Thus, the combustion by the pre-injection can be realized more reliably as the PCCI combustion, and the rises of the in-cylinder pressure and the in-cylinder temperature can be further suppressed. As a result, in the diesel engine according to the present invention, the reduction of NOx and the reduction of PM by the introduction of the exhaust circulating means can be realized more reliably at the same time.

In the diesel engine according to the present invention, it is preferably characterized in that the control device executes the pre-injection prior to the main injection only once.

According to the diesel engine according to the present invention, even if the control device executes the pre-injection prior to the main injection only once, it can generate the homogenous and lean premixed air-fuel mixture by the fuel injected by the pre-injection and the air in the auxiliary combustion chamber during a period until the piston reaches the top dead center in the compression stroke.

In the diesel engine according to the present invention, it is preferably characterized in that the pre-injection is pilot injection.

According to the diesel engine according to the present invention, the control device can keep the peak of the heat generation rate low when the fuel injected by the pilot injection is combusted and suppress deterioration of the illustrated heat efficiency by realizing the combustion by the pilot injection as the PCCI combustion. As a result, discharge of the unburned fuel as PM is suppressed, and PM can be further reduced.

Advantageous Effects of Injection

According to the present invention, the diesel engine that can realize the reduction of NOx and the reduction of PM at the same time can be provided.

DESCRIPTION OF EMBODIMENTS

Figure 1:
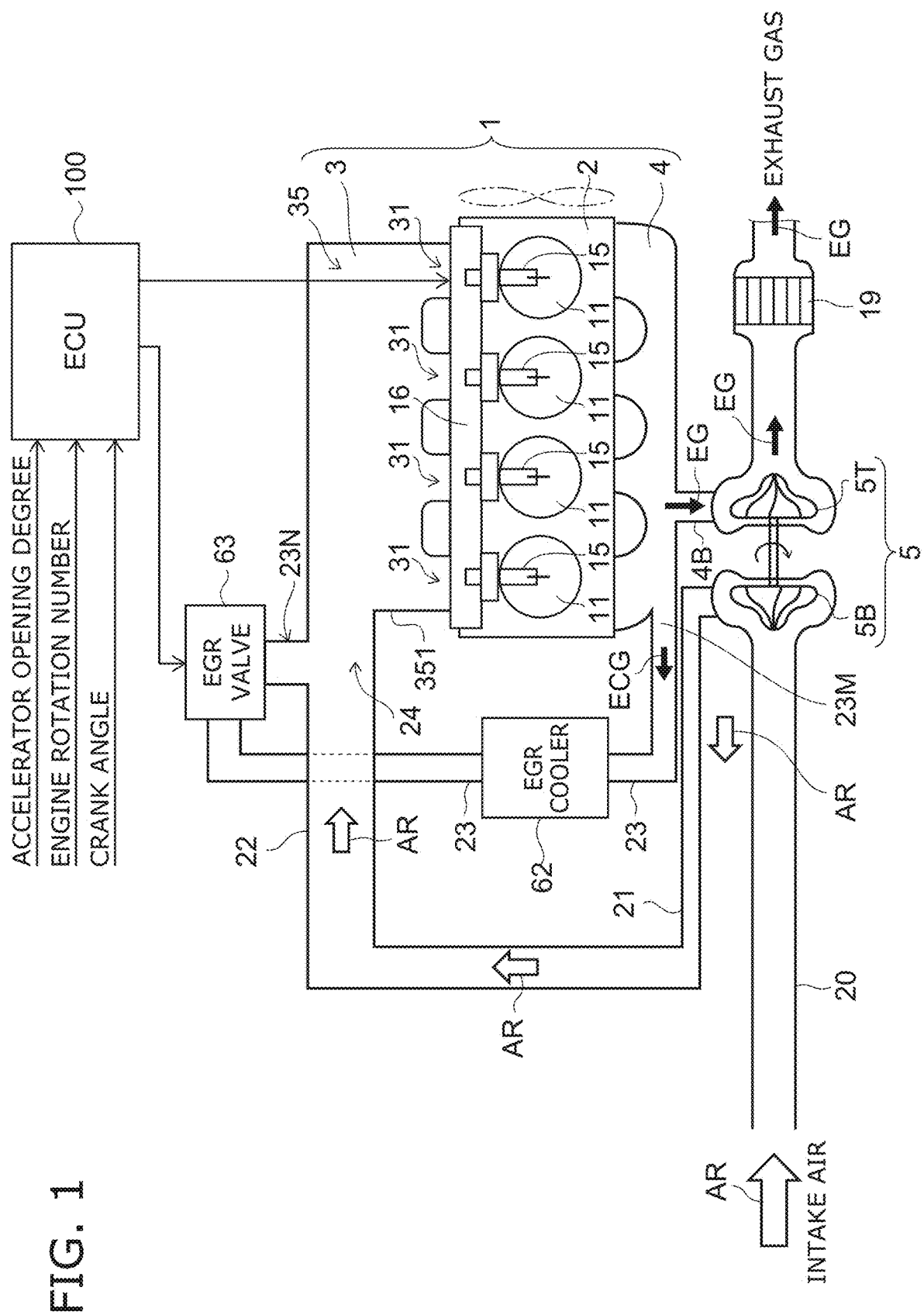
FIG. 1 is a schematic diagram illustrating a diesel engine according to an embodiment of the present invention.

Hereinafter, a preferred embodiment of the present invention will be described in detail with reference to the drawings.

Note that the embodiment described below is a preferred specific example of the present invention and thus, technically preferable various limitations are given, but a scope of the present invention is not limited to these forms unless there is a description that particularly limits the present invention in the following explanation. Moreover, in each of the drawings, the same reference numerals are given to the similar constituent elements, and detailed explanation will be omitted as appropriate.

FIG. 1 is a schematic diagram illustrating a diesel engine according to an embodiment of the present invention.

Figure 2:
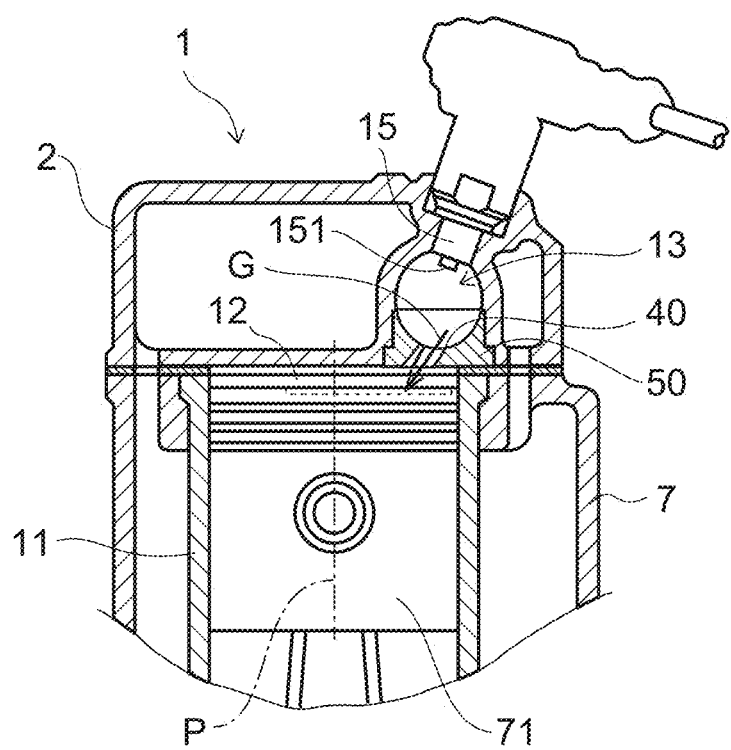
FIG. 2 is a sectional view illustrating a vicinity of a main combustion chamber and an auxiliary combustion chamber of the diesel engine according to this embodiment.

FIG. 2 is a sectional view illustrating a vicinity of a main combustion chamber and an auxiliary combustion chamber of the diesel engine according to this embodiment.

A diesel engine 1 according to this embodiment is an internal combustion engine and is an industrial diesel engine, for example. The diesel engine 1 is a vertical straight multicylinder engine such as a supercharging high-output 4-cylinder engine with a turbocharger, for example. The diesel engine 1 is mounted on vehicles such as a construction machine, an agricultural machine, a lawn mower and the like. Note that the number of cylinders is not particularly limited and may be three or less or five or more.

The diesel engine 1 includes a cylinder head 2, an intake manifold (intake manifold) 3, an exhaust manifold (exhaust manifold) 4, a turbocharger 5, an EGR (Exhaust Gas Recirculation) valve 63, an EGR cooler 62, an EGR gas passage 23, and an ECU (Electronic Control Unit) 100. The ECU 100 in this embodiment is an example of a "control device" of the present invention. The EGR valve 63, the EGR cooler 62, and the EGR gas passage 23 of this embodiment are included in "exhaust circulating means" of the present invention. Note that the diesel engine 1 does not necessarily have to include the turbocharger 5.

The diesel engine 1 illustrated in FIG. 1 is a vertical straight multicylinder engine having four cylinders 11, for example. The intake manifold 3 has a main pipe 35 having a start end portion 351 into which an intake (intake air) AR flows on one end and a branch pipe 31 branching from the main pipe 35. The intake air AR of this embodiment is an example of "air" in the present invention. A longitudinal direction of the main pipe 35 goes along a direction in which a plurality of the cylinders 11 are aligned, that is, a crank shaft extends. The branch pipe 31 of the intake manifold 3 is connected to the cylinder 11.

In the combustion chamber of the cylinder 11, an injector 15 is provided. The injector 15 is connected to a common rail 16. Fuel in a fuel tank, not shown, is sent to the common rail 16 by an operation of a fuel pump. The common rail 16 accumulates the fuel sent from the fuel pump on the basis of control of the ECU 100. The fuel accumulated in the common rail 16 is injected from the injector 15 into the combustion chamber. Details of this will be described later.

The turbocharger 5 has a blower 5B and a turbine 5T and supercharges the intake air AR to be sent to the intake manifold 3. The blower 5B is connected to an intake piping 20 and an intake passage 21. The intake passage 21 is connected to an inlet flange 22 of the intake manifold 3. The turbine 5T is connected to an exhaust passage 4B. When an exhaust gas EG introduced through the exhaust passage 4B of the exhaust manifold 4 is supplied to the turbine 5T of the turbocharger 5, the turbine 5T and the blower 5B are rotated at a high speed. By means of the high-speed rotation of the blower 5B, the intake air AR supplied to the blower 5B of the turbocharger 5 and compressed is supercharged to the intake manifold 3 through the intake passage 21. The exhaust gas EG exhausted from the turbine 5T is exhausted to an outside of the diesel engine 1 via a DPF (Diesel particulate filter) 19 and the like.

As shown in FIG. 1, a start end portion 23M of the EGR gas passage 23 is connected to the exhaust manifold 4. Alternatively, the start end portion 23M of the EGR gas passage 23 may be connected to the exhaust passage 4B between the exhaust manifold 4 and the turbine 5T. A distal end portion 23N of the EGR gas passage 23 is connected to the inlet flange 22. In the EGR gas passage 23, the EGR valve 63 and the EGR cooler 62 are provided. The EGR cooler 62 cools an exhaust circulation gas ECG flowing through the EGR gas passage 23.

The ECU 100 controls operations of the EGR valve 63, the common rail 16 and the like. As shown in FIG. 1, a detection signal related to the accelerator opening degree, a detection signal related to the engine rotation number, and a detection signal related to the crank angle are input into the ECU 100. A supply amount of the intake air AR supplied to the inlet flange 22 of the intake manifold 3 is controlled by an instruction of the ECU 100 based on the accelerator opening degree. The EGR valve 63 adjusts the supply amount of the exhaust circulation gas ECG supplied to the inlet flange 22 of the intake manifold 3 from the exhaust manifold 4 by the instruction of the ECU 100.

Moreover, the ECU 100 controls an injection timing and an injection amount of the fuel injected from the injector 15. For example, the ECU 100 controls the injection timing and the injection amount of the fuel by using a governor map set in advance on the basis of the detection signal related to the accelerator opening degree and the detection signal related to the engine rotation number. The injection amount of the fuel is controlled by a conduction period of the injector 15, for example.

As shown in FIG. 2, the diesel engine 1 according to this embodiment is a so-called auxiliary-chamber type diesel engine and has a main combustion chamber 12 and an auxiliary combustion chamber 13. The diesel engine 1 includes a cylinder block 7. The cylinder (cylinder) 11 is provided inside the cylinder block 7. A piston 71 is disposed inside the cylinder 11 and is capable of reciprocating movement along a cylinder center axis P. The main combustion chamber 12 is formed on an upper part of the cylinder 11.

The cylinder head 2 is assembled on the cylinder block 7. The auxiliary combustion chamber 13 is formed inside the cylinder head 2. The auxiliary combustion chamber 13 is also called an auxiliary chamber, a swirl chamber or a vortex chamber.

The main combustion chamber 12 is connected to the auxiliary combustion chamber 13 via a mouth ring 50. The mouth ring 50 has a nozzle hole 40 through which a combustion air flow G flows. The main combustion chamber 12 communicates with the auxiliary combustion chamber 13 through the nozzle hole 40 of the mouth ring 50. The nozzle hole 40 is provided at a spot which is eccentric with respect to the main combustion chamber 12. For example, the nozzle hole 40 is formed in a diagonally downward direction substantially along a tangent direction of an inner peripheral surface of the auxiliary combustion chamber 13.

The injector 15 is mounted on the cylinder head 2. An injection portion 151 of the injector 15 is provided by facing an inside of the auxiliary combustion chamber 13 and is exposed to an internal space of the auxiliary combustion chamber 13 from above to diagonally below. The injector 15 injects the fuel into the auxiliary combustion chamber 13 on the basis of the control signals related to the injection timing and the injection amount transmitted from the ECU 100.

Subsequently, control related to the fuel injection executed by the ECU 100 of this embodiment will be explained in detail with reference to the drawings.

FIG. 3 to FIG. 6 are schematic diagrams for explaining the control related to the fuel injection executed by the ECU of this embodiment.

Figure 7:
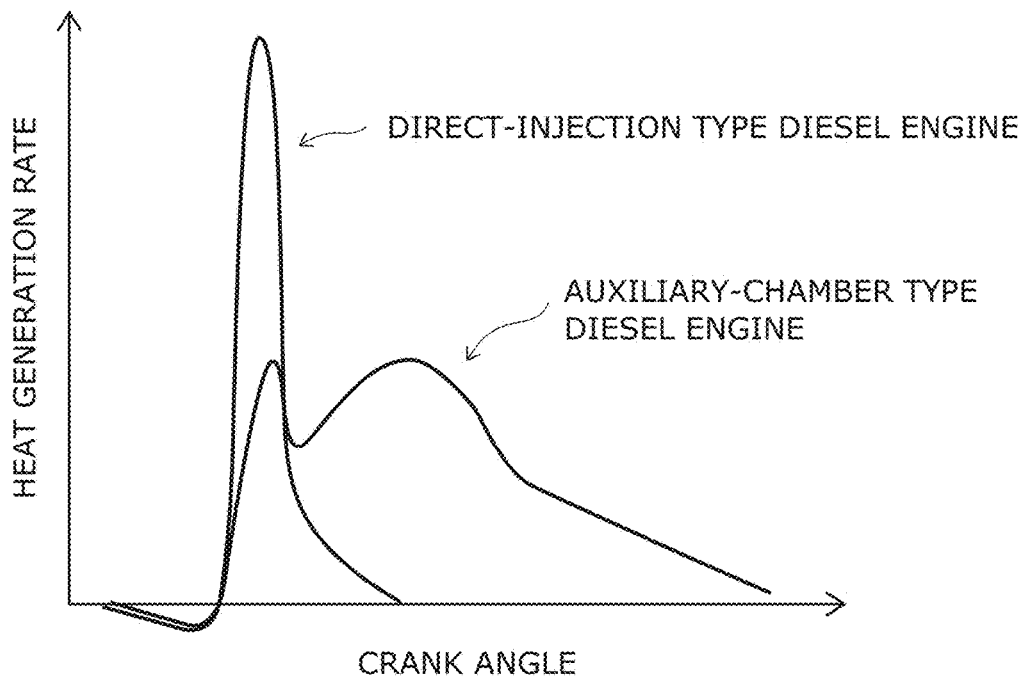
FIG. 7 is a graph exemplifying a relation between a crank angle and a heat generation rate.

FIG. 7 is a graph exemplifying a relation between the crank angle and the heat generation rate.

Figure 3:
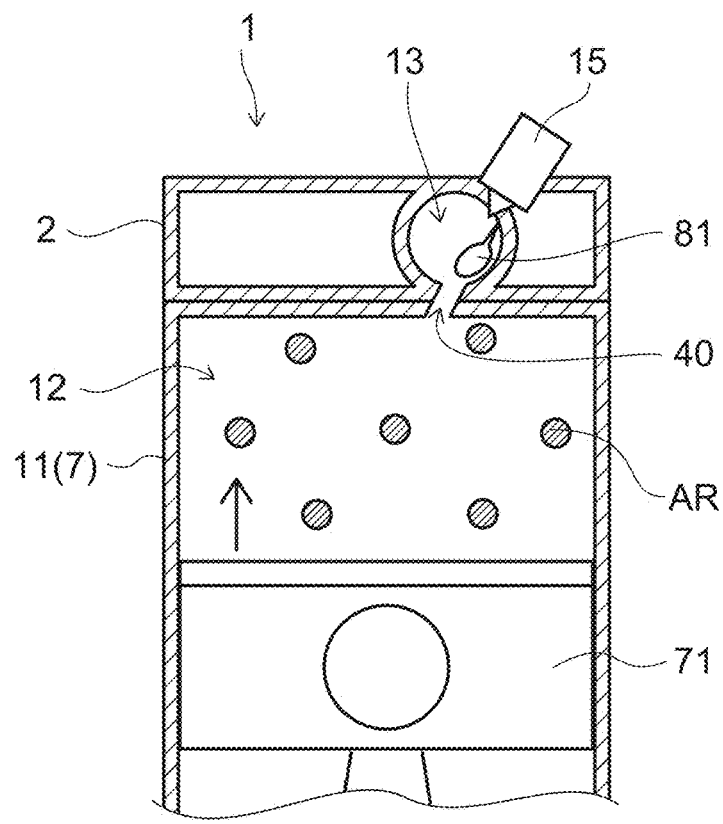
FIG. 3 is a schematic diagram for explaining control related to fuel injection executed by an ECU of this embodiment.
Figure 4:
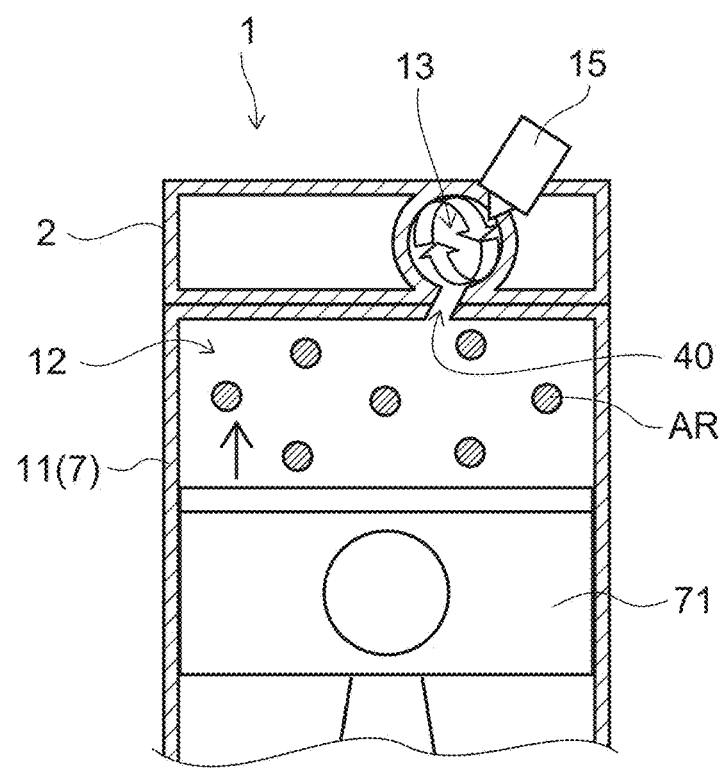
FIG. 4 is a schematic diagram for explaining control related to the fuel injection executed by the ECU of this embodiment.
Figure 5:
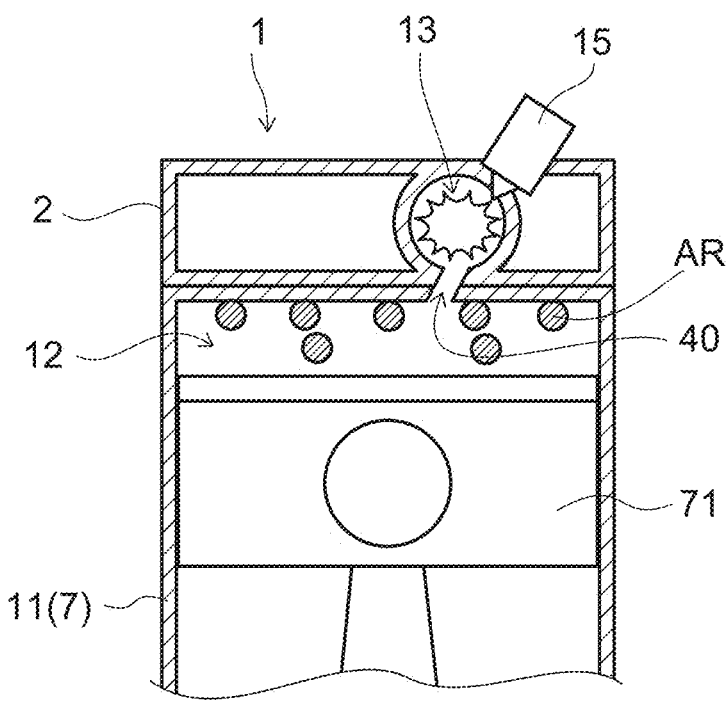
FIG. 5 is a schematic diagram for explaining control related to the fuel injection executed by the ECU of this embodiment.
Figure 6:
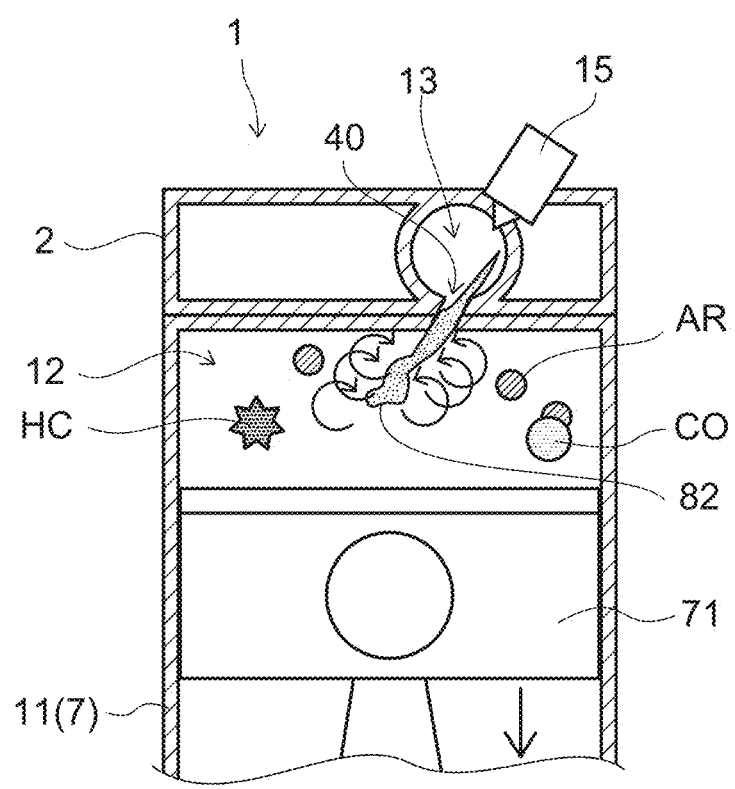
FIG. 6 is a schematic diagram for explaining control related to the fuel injection executed by the ECU of this embodiment.

Note that FIG. 3 and FIG. 4 are schematic diagrams illustrating the compression stroke of the diesel engine according to this embodiment. FIG. 5 and FIG. 6 are schematic diagrams illustrating a combustion stroke of the diesel engine according to this embodiment.

The ECU 100 of this embodiment controls the injector 15 and performs multi-stage injection which divides the fuel injection into plural times in one cycle. Specifically, the ECU 100 performs the main injection and the pilot injection in which the fuel of an injection amount smaller than the injection amount in the main injection is injected prior to the main injection in one cycle.

The pilot injection in this embodiment is an example of the "pre-injection" of the present invention. Note that the "pre-injection" of the present invention is not limited to the pilot injection but may be pre-injection or may include both the pilot injection and the pre-injection. In the explanation below, a case in which the pre-injection is the pilot injection will be used as an example.

As shown in FIG. 3, the ECU 100 controls the injection timing and the injection amount of the pilot injection and injects fuel 81 into the auxiliary combustion chamber 13. Here, the ECU 100 of this embodiment executes the control for generating a homogenous and lean premixed air-fuel mixture by the fuel 81 injected by the pilot injection and the intake air AR in the auxiliary combustion chamber 13 by ensuring the premixing period of the pilot injection from the start of the pilot injection until the air-fuel mixture of the fuel 81 injected by the pilot injection and the intake air AR is ignited. In this description, the "premixing period" is assumed to refer to the period from the start of the fuel injection to the ignition of the air-fuel mixture of the fuel and the intake air (sucked air).

By specifically explaining the control related to the fuel injection executed by the ECU 100 of this embodiment, the ECU 100 sets the timing when the crank angle is 60° or more and 120° or less before the top dead center in the compression stroke as the injection timing of the pilot injection. That is, the injection timing of the pilot injection is the timing when the crank angle is 60° or more and 120° or less before the top dead center in the compression stroke. More preferably, the ECU 100 sets the timing when the crank angle is 80° or more and 120° or less before the top dead center in the compression stroke as the injection timing of the pilot injection. That is, more preferably, the injection timing of the pilot injection is the timing when the crank angle is 80° or more and 120° or less before the top dead center in the compression stroke. Thus, as shown in FIG. 3, when the pilot injection is executed, the piston 71 is present on a lower part of the cylinder 11. Moreover, the ECU 100 sets the injection amount of the pilot injection in an amount as a small as possible. In this embodiment, the injection amount of the plot injection is set to a lower-limit injection amount of the injector 15 or set to 30% or less of the injection amount of the main injection, for example.

Subsequently, as shown in FIG. 4, the piston 71 further rises toward the top dead center in the compression stroke. Then, the intake air AR in the main combustion chamber 12 passes through the nozzle hole 40 and flows into the auxiliary combustion chamber 13. At this time, as an arrow inside the auxiliary combustion chamber 13 shown in FIG. 4, an eddy current stronger than an air flow generated in the combustion chamber of the direct-injection type diesel engine is generated in the auxiliary combustion chamber 13. As a result, the fuel 81 injected into the auxiliary combustion chamber 13 by the pilot injection and the intake air AR having flown into the auxiliary combustion chamber 13 are mixed with each other by the eddy current generated in the auxiliary combustion chamber 13.

In a state shown in FIG. 4, the piston 71 has not reached the top dead center in the compression stroke yet but is present in a lower part or an intermediate part of the cylinder 11. Thus, the temperature and the pressure of the air-fuel mixture formed in the auxiliary combustion chamber 13 have not risen as the temperature and the pressure at which the air-fuel mixture is ignited. As a result, the fuel 81 injected into the auxiliary combustion chamber 13 by the pilot injection is not combusted until the piston 71 reaches the vicinity of the top dead center in the compression stroke (approximately 10° before the top dead center, for example) but is premixed with the intake air AR having flown into the auxiliary combustion chamber 13.

Subsequently, as shown in FIG. 5, when the piston 71 reaches the vicinity of the top dead center in the compression stroke (approximately 10° before the top dead center, for example), the air-fuel mixture of the fuel 81 injected into the auxiliary combustion chamber 13 by the pilot injection and the intake air AR having flown into the auxiliary combustion chamber 13 is ignited in the auxiliary combustion chamber 13 and is combusted.

As described above, in the diesel engine 1 according to this embodiment, for a long period from when the pilot injection is started at a timing when the crank angle is 60° or more and 120° or less or 80° or more and 120° or less before the top dead center in the compression stroke until the piston 71 reaches the vicinity of the top dead center in the compression stroke (approximately 10° before the top dead center, for example), the fuel 81 injected into the auxiliary combustion chamber 13 by the pilot injection is premixed with the intake air AR having flown into the auxiliary combustion chamber 13. Since a relatively large amount of the intake air AR with respect to a micro injection amount of the fuel 81 in the pilot injection is present in the auxiliary combustion chamber 13 and thus, a homogenous and lean premixed air-fuel mixture is generated in the auxiliary combustion chamber 13. As described above, the ECU 100 of this embodiment executes the control of generating the homogenous and lean premixed air-fuel mixture by the fuel 81 injected by the pilot injection and the intake air AR in the auxiliary combustion chamber 13 by ensuring the premixing period of the pilot injection from the start of the pilot injection until the air-fuel mixture of the fuel 81 injected by the pilot injection and the intake air AR is ignited.

Then, when the piston 71 reaches the vicinity of the top dead center in the compression stroke (approximately 10° before the top dead center, for example), the premixed air-fuel mixture is combusted in a homogenous state where an air-fuel ratio (air-fuel ratio: A/F) is lean. As a result, PCCI (Premixed Charge Compression Ignition) combustion is generated in the auxiliary combustion chamber 13.

After that, after the peak of the heat generation rate generated by the pilot injection and before the top dead center in the compression stroke, the main injection is started. That is, the ECU 100 sets the timing after the peak of the heat generation rate generated by the pilot injection and before the top dead center in the compression stroke as the injection timing of the main injection. In this embodiment, the main injection is started at 2° before the top dead center in the compression stroke, for example (see FIG. 10). And the ignition of the main injection is started at the top dead center and after in the compression stroke.

Subsequently, as shown in FIG. 6, a flame 82 having occurred in the auxiliary combustion chamber 13 flows into the main combustion chamber 12. Then, the flame 82 having flown into the main combustion chamber 12 takes in the intake air AR present in the main combustion chamber 12. As a result, diffusive combustion occurs in the main combustion chamber 12. According to the finding obtained by the present invention, as in the graph shown in FIG. 7, in the auxiliary-chamber type diesel engine 1, as compared with the direct-injection type diesel engine, a combustion period is longer. Thus, generation of unburned substances such as HC (hydrocarbon) and CO (carbon monoxide) can be suppressed.

Note that, in the direct-injection type diesel engine, if the timing when the crank angle is 60° or more and 120° or less or 80° or more and 120° or less before the top dead center in the compression stroke is set as the injection timing of the pilot injection, when the pilot injection is performed, such a strong air flow that would be generated in the auxiliary combustion chamber 13 of the auxiliary-chamber type diesel engine 1 is not generated in the combustion chamber of the direct-injection type diesel engine. Thus, the fuel injected into the combustion chamber from the injector might adhere to the inner wall surface of the cylinder. Then, the air-fuel mixture is combusted in a state where the fuel and the intake air are not sufficiently mixed. That is, simultaneous multi-point ignition by the main injection occurs. Then, generation of the unburned substances such as HC (hydrocarbon) and CO (carbon monoxide) cannot be suppressed in some cases.

On the other hand, in the auxiliary-chamber type diesel engine 1 according to this embodiment, even if the timing when the crank angle is 60° or more and 120° or less or 80° or more and 120° or less before the top dead center in the compression stroke is set as the injection timing of the pilot injection, when the pilot injection is performed, the eddy current stronger than the air flow generated in the combustion chamber of the direct-injection type diesel engine is generated in the auxiliary combustion chamber 13. Thus, adhesion of the fuel 81 injected into the auxiliary combustion chamber 13 from the injector 15 to the inner wall surface of the auxiliary combustion chamber 13 can be suppressed. As a result, the fuel 81 injected into the auxiliary combustion chamber 13 by the pilot injection and the intake air AR having flown into the auxiliary combustion chamber 13 can be sufficiently mixed with each other by the eddy current generated in the auxiliary combustion chamber 13. Therefore, generation of the unburned substances such as HC (hydrocarbon) and CO (carbon monoxide) can be suppressed.

Subsequently, while examples of the examination results performed by the inventor are presented, the control related to the fuel injection executed by the ECU 100 of this embodiment will be further explained.

Figure 8:
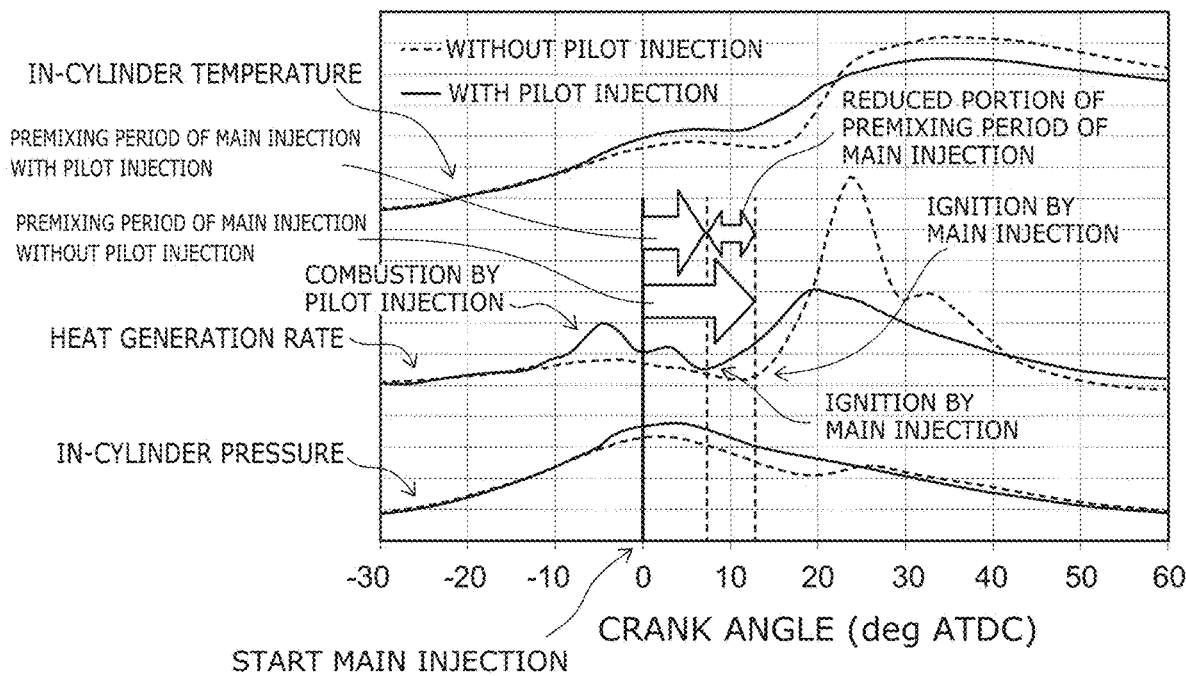
FIG. 8 is a graph illustrating an example of an examination result comparing presence/absence of pilot injection.

FIG. 8 is a graph illustrating an example of an examination result in which presence/absence of the pilot injection are compared.

Figure 9:
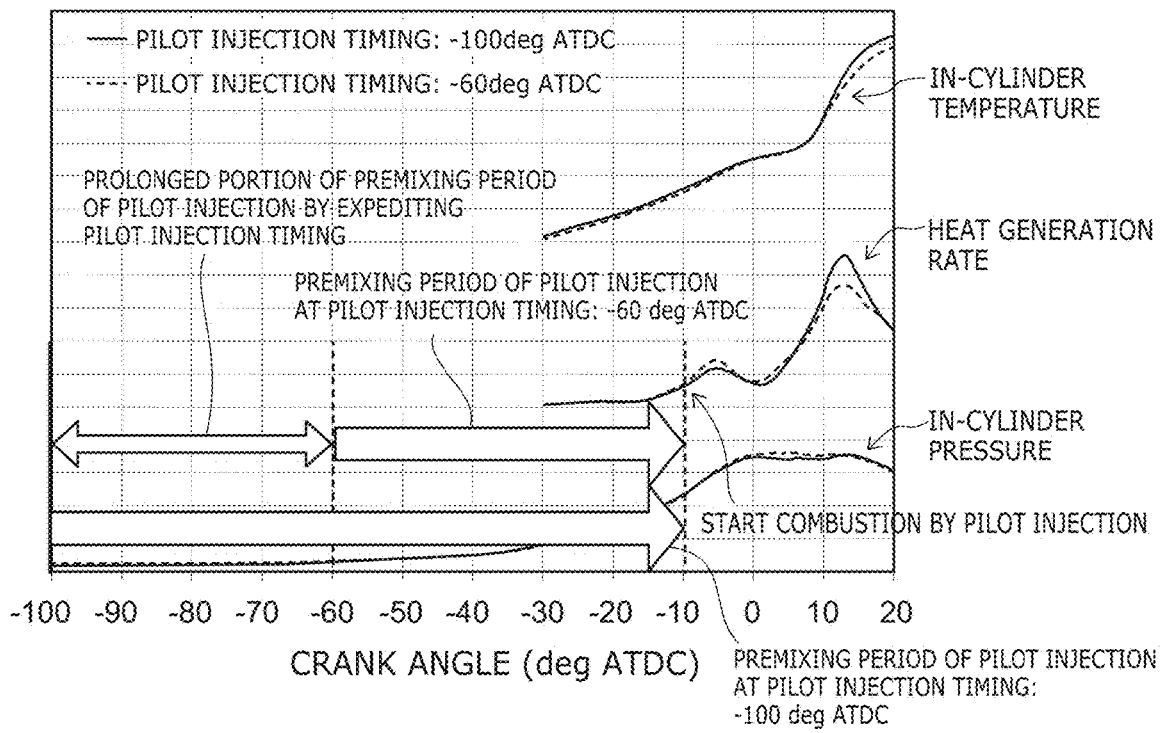
FIG. 9 is a graph illustrating an example of an examination result comparing pilot injection timings.

FIG. 9 is a graph illustrating an example of an examination result in which pilot injection timings are compared.

Figure 10:
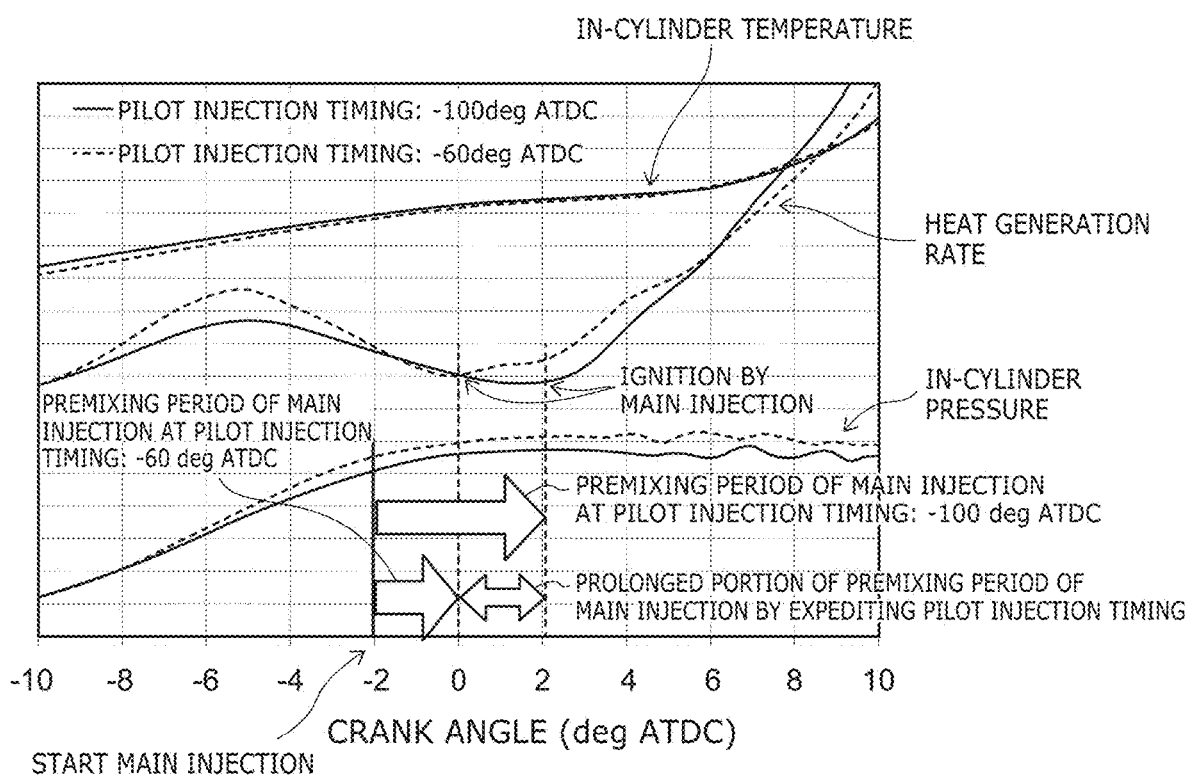
FIG. 10 is an enlarged graph which enlarges a range in which a crank angle in the graph illustrated in FIG. 9 is 10° or more before the top dead center and 10° or less after the top dead center.

FIG. 10 is an enlarged graph which enlarges a range in which a crank angle in the graph shown in FIG. 9 is 10° or more before the top dead center and 10° or less after the top dead center.

Figure 11:
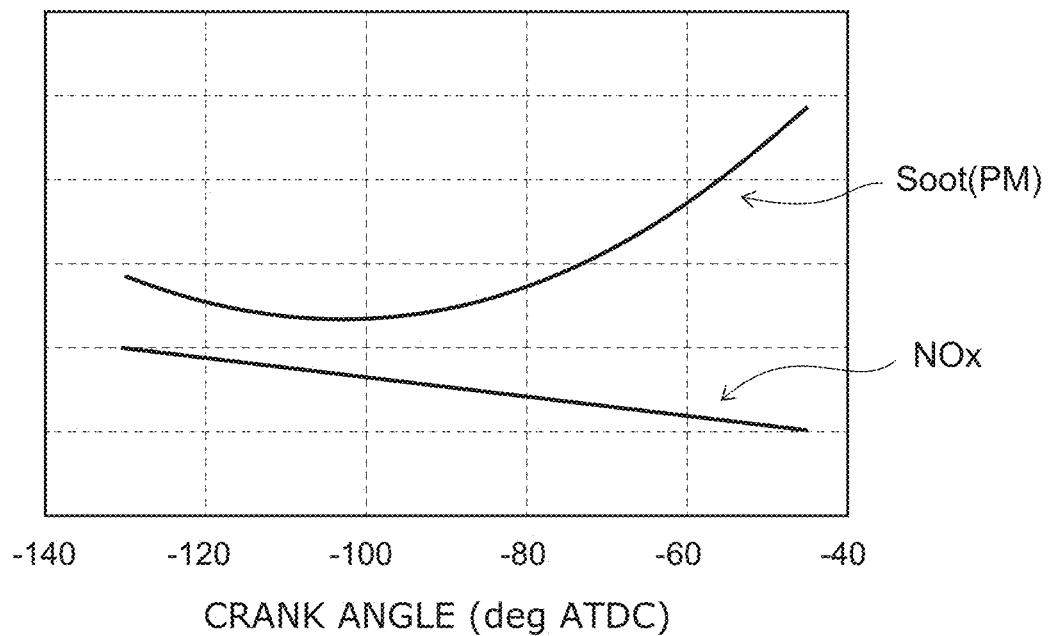
FIG. 11 is a graph illustrating an example of a relation between the crank angle at the pilot injection timing and Soot (PM) and NOx.

FIG. 11 is a graph illustrating an example of a relation between the crank angle at the pilot injection timing and Soot (PM) as well as NOx.

Note that a unit "deg ATDC" of the crank angle shown in FIG. 8 to FIG. 11 means an angle (°: degree) of the After Top Dead Center in the compression stroke. That is, "−10 (deg ATDC)" means that the crank angle is 10° before the top dead center in the compression stroke. "10 (deg ATDC)" means that the crank angle is 10° after the top dead center in the compression stroke.

In general, it is known that NOx can be reduced by introducing the EGR. However, when the EGR is introduced, the oxygen concentration in the air sucked into the cylinder becomes lower than the case where the EGR is not introduced and thus, there is a concern that ignition of the fuel is difficult or misfire occurs. On the other hand, it is known that the performance of the pilot injection prior to the main injection is effective.

However, as shown in FIG. 8, if the pilot injection is performed prior to the main injection, the fuel injected by the pilot injection is combusted, whereby the pressure and the temperature in the cylinder rise. Then, as shown in FIG. 8, the ignition by the main injection becomes earlier than the case where the pilot injection is not performed. That is, the premixing period of the main injection becomes shorter than the case where the pilot injection is not performed. If the premixing period of the main injection becomes shorter, the air-fuel mixture is combusted before the fuel injected by the main injection and the intake air are sufficiently mixed. Then, when the fuel injected by the main injection is combusted, a generation amount of the particulate substances (PM: Particulate Matter) such as soot increases. Moreover, by means of the rise in the pressure in the cylinder by the combustion gas generated when the fuel injected by the pilot injection is combusted, a force in a direction against the rise of the piston acts on the piston. Then, the illustrated heat efficiency deteriorates, and the fuel consumption deteriorates. Thus, excess fuel is injected in the main injection, and the unburned fuel is discharged as PM.

Then, as described above in relation with FIG. 3 to FIG. 7, the ECU 100 in this embodiment executes such control that the homogenous and lean premixed air-fuel mixture is generated by the fuel 81 injected by the pilot injection and the intake air AR in the auxiliary combustion chamber 13 by ensuring the premixing period of the pilot injection from the start of the pilot injection until the air-fuel mixture of the fuel 81 injected by the pilot injection and the intake air AR is ignited. Specifically, the ECU 100 sets the injection amount of the pilot injection as small as possible and sets the timing when the crank angle is 60° or more and 120° or less before the top dead center in the compression stroke as the injection timing of the pilot injection. More preferably, the ECU 100 sets the timing when the crank angle is 80° or more and 120° or less before the top dead center in the compression stroke as the injection timing of the pilot injection.

As described above, when the ECU 100 expedites the injection timing of the pilot injection very much to such a degree that the homogenous and lean premixed air-fuel mixture can be generated in the auxiliary combustion chamber 13, as in the graph exemplified in FIG. 9, for example, the premixing period of the pilot injection when the timing when the crank angle is 100° before the top dead center in the compression stroke is set as the injection timing of the pilot injection becomes longer than the premixing period of the pilot injection when the timing when the crank angle is 60° before the top dead center in the compression stroke is set as the injection timing of the pilot injection. That is, the ECU 100 can sufficiently ensure the premixing period of the pilot injection by expediting the injection timing of the pilot injection very much to such a degree that the homogenous and lean premixed air-fuel mixture can be generated in the auxiliary combustion chamber 13. Therefore, as in the graphs exemplified in FIG. 9 and FIG. 10, for example, the combustion by the pilot injection generated approximately at 10° before the top dead center in the compression stroke and after can be realized as the PCCI combustion. As a result, the rises in the in-cylinder pressure and the in-cylinder temperature when the fuel 81 injected by the pilot injection is combusted can be suppressed, and the peak of the heat generation rate generated by the pilot injection can be kept low.

As a result, the ECU 100 executes the control for ensuring the premixing period of the main injection from the start of the main injection until the air-fuel mixture of the fuel 81 injected by the main injection and the intake air AR is ignited so that the premixing period of the main injection can be prolonged. As in the graph exemplified in FIG. 10, for example, the ignition of the main injection when the timing when the crank angle is 100° before the top dead center in the compression stroke is set as the injection timing of the pilot injection becomes later than the ignition of the main injection when the timing when the crank angle is 60° before the top dead center in the compression stroke is set as the injection timing of the pilot injection. That is, the premixing period of the main injection when the timing when the crank angle is 100° before the top dead center in the compression stroke is set as the injection timing of the pilot injection becomes longer than the premixing period of the main injection when the timing when the crank angle is 60° before the top dead center in the compression stroke is set as the injection timing of the pilot injection. As described above, the ECU 100 can prolong the premixing period of the main injection by expediting the injection timing of the pilot injection very much to such a degree that the homogeneous and lean premixed air-fuel mixture can be generated in the auxiliary combustion chamber 13. Therefore, the air-fuel mixture is combusted after the fuel 81 injected by the main injection and the intake air AR are sufficiently mixed.

As a result, when the ECU 100 expedites the injection timing of the pilot injection very much to such a degree that the homogenous and lean premixed air-fuel mixture can be generated in the auxiliary combustion chamber 13, as in a graph exemplified in FIG. 11, for example, the generation amount of the particulate substances (PM) such as soot (Soot) at the timing when the crank angle is 100° before the top dead center in the compression stroke is set as the injection timing of the pilot injection is smaller than the generation amount of the PM when the timing when the crank angle is 60° before the top dead center in the compression stroke is set as the injection timing of the pilot injection. That is, the ECU 100 can suppress the generation amount of the particulate substances (PM) such as soot (Soot) by expediting the injection timing of the pilot injection very much to such a degree that the homogeneous and lean premixed air-fuel mixture can be generated in the auxiliary combustion chamber 13.

Note that, in the direct-injection type diesel engine, if the timing when the crank angle is 60° or more and 120° or less or 80° or more and 120° or less before the top dead center in the compression stroke is set as the injection timing of the pilot injection, the fuel injected into the combustion chamber from the injector might adhere to the inner wall surface of the cylinder in some cases. Then, the air-fuel mixture is combusted in a state where the fuel and the intake air are not sufficiently mixed. That is, the simultaneous multi-point ignition by the main injection occurs. Then, generation of the unburned substances such as HC (hydrocarbon) and CO (carbon monoxide) cannot be suppressed in some cases.

As described above, according to the diesel engine 1 according to this embodiment, the ECU 100 controls the injection timing of the main injection and the pilot injection performed prior to the main injection and executes the control of generating the homogenous and lean premixed air-fuel mixture in the auxiliary combustion chamber 13 by the fuel 81 injected by the pilot injection and the intake air AR by ensuring the premixing period of the pilot injection from the start of the pilot injection until the air-fuel mixture of the fuel 81 injected by the pilot injection and the intake air AR is ignited. As described above, the ECU 100 ensures the premixing period from the start of the pilot injection until the air-fuel mixture of the fuel 81 injected by the pilot injection and the intake air AR is ignited by expediting the injection timing of the pilot injection very much to such a degree that the homopterous and lean premixed air-fuel mixture can be generated in the auxiliary combustion chamber 13. Thus, the combustion by the pilot injection can be realized as the PCCI combustion. Thus, the rises in the in-cylinder pressure and the in-cylinder temperature when the fuel 81 injected by the pilot injection is combusted can be suppressed, and the peak of the heat generation rate generated by the pilot injection can be kept low. As a result, the ECU 100 executes the control for ensuring the premixing period of the main injection from the start of the main injection until the air-fuel mixture of the fuel 81 injected by the main injection and the intake air AR is ignited so that the premixing period of the main injection can be prolonged. Therefore, the generation of the PM can be suppressed. As a result, the diesel engine 1 according to this embodiment can realize the reduction of NOx and the reduction of PM by the introduction of the EGR at the same time.

Moreover, the injection timing of the main injection is the timing after the peak of the heat generation rate generated by the pilot injection and before the top dead center in the compression stroke. That is, the ECU 100 sets the timing after the peak of the heat generation rate generated by the pilot injection and before the top dead center in the compression stroke as the injection timing of the main injection. Thus, the longer premixing period of the main injection can be ensured. As a result, the diesel engine 1 according to this embodiment can realize the reduction of NOx and the reduction of PM by the introduction of the EGR more reliably.

Moreover, the timing when the air-fuel mixture of the fuel 81 injected by the main injection and the intake air AR is ignited is the top dead center and after in the compression stroke. Thus, a longer premixing period of the main injection can be ensured. As a result, the diesel engine 1 according to this embodiment can realize the reduction of NOx and the reduction of PM by the introduction of the EGR more reliably at the same time.

Moreover, the injection timing of the pilot injection is the timing when the crank angle is 60° or more and 120° or less before the top dead center in the compression stroke. That is, the ECU 100 sets the timing when the crank angle is 60° or more and 120° or less before the top dead center in the compression stroke as the ignition timing of the pilot injection. More preferably, the injection timing of the pilot injection is the timing when the crank angle is 80° or more and 120° or less before the top dead center in the compression stroke. That is, more preferably, the ECU 100 sets the timing when the crank angle is 80° or more and 120° or less before the top dead center in the compression stroke as the ignition timing of the pilot injection. Thus, the ECU 100 can ensure the sufficient premixing period from the start of the pilot injection until the air-fuel mixture of the fuel 81 injected by the pilot injection and the intake air AR is ignited and can execute the control for generating the homogenous and lean premixed air-fuel mixture by the fuel 81 injected by the pilot injection and the intake air AR in the auxiliary combustion chamber 13. Thus, the combustion by the pilot injection can be more reliably realized as the PCCI combustion, and the rises in the in-cylinder pressure and the in-cylinder temperature can be further suppressed. As a result, the diesel engine 1 according to this embodiment can realize the reduction of NOx and the reduction of PM by the introduction of the EGR more reliably at the same time.

Moreover, the ECU 100 may execute the pilot injection prior to the main injection only once. Even in this case, during a period until the piston 71 reaches the top dead center in the compression stroke, the homogenous and lean premixed air-fuel mixture can be generated by the fuel 81 injected by the pilot injection and the intake air AR in the auxiliary combustion chamber 13.

Furthermore, the ECU 100 can keep the peak of the heat generation rate low when the fuel 81 injected by the pilot injection is combusted and suppress deterioration of the illustrated heat efficiency by realizing the combustion by the pilot injection as the PCCI combustion. As a result, the discharge of the unburned fuel as PM can be suppressed, and further reduction of PM can be promoted.

As described above, the embodiment of the present invention has been explained. However, the present invention is not limited to the aforementioned embodiment but various changes can be made within a range not departing from the scope of claims. Configurations of the aforementioned embodiment may be partially omitted or arbitrarily combined differently from the above.

REFERENCE SIGNS LIST

1 Diesel engine
2 Cylinder head
3 Intake manifold
4 Exhaust manifold
4B Exhaust passage
5 Turbocharger
5B Blower
5T Turbine
7 Cylinder block
11 Cylinder
12 Main combustion chamber
13 Auxiliary combustion chamber
15 Injector
16 Common rail
19 Diesel particulate filter
20 Intake piping
21 Intake passage
22 Inlet flange
23 EGR gas passage
23M Start end portion
23N Distal end portion
31 Branch pipe
35 Main pipe
40 Nozzle hole
50 Mouth ring
62 EGR cooler
63 EGR valve
71 Piston
81 Fuel
82 Flame
100 ECU
151 Injection portion
351 Start end portion
AR Intake air
ECG Exhaust circulation gas
EG Exhaust gas
G Combustion air flow
P Cylinder center axis

The invention claimed is:

1. A diesel engine having a main combustion chamber and an auxiliary combustion chamber communicating with the main combustion chamber, the diesel engine comprising:
    an injector having an injection portion that is provided facing an inside of the auxiliary combustion chamber, is exposed to an internal space of the auxiliary combustion chamber, and injects fuel into the internal space;
    a control device that controls an injection timing of the fuel injected from the injection portion; and
    exhaust circulating means that circulates exhaust of the diesel engine wherein,
    the control device controls the injection timing of main injection of the diesel engine and pre-injection of the diesel engine performed prior to the main injection and executes control such that, by ensuring a premixing period of the pre-injection from start of the pre-injection until ignition of a first air-fuel mixture of the fuel injected by the pre-injection and air, the first air-fuel mixture, which is homogenous and lean, is generated in the auxiliary combustion chamber by the fuel injected by the pre-injection and the air, and the premixing period of the main injection from the start of the main injection until ignition of a second air-fuel mixture of the fuel injected by the main injection and the air is ensured,
    the fuel for the pre-injection is injected at a crank angle of the diesel engine of 120° before top dead center or after in a compression stroke of the diesel engine,
    the first air-fuel mixture ignites at the crank angle after 10° before the top dead center in the compression stroke and prior to the top dead center in the compression stroke, and
    the fuel for the main injection is injected after a peak heat generation rate of the diesel engine generated by ignition of the first air-fuel mixture and before the top dead center in the compression stroke.

2. The diesel engine according to claim 1, wherein the second air-fuel mixture ignites at the top dead center and after the top dead center in the compression stroke.

3. The diesel engine according to claim 1, wherein the fuel for the pre-injection is injected at the crank angle of 60° before the top dead center or before in the compression stroke.

4. The diesel engine according to claim 1, wherein the fuel for the pre-injection is injected at the crank angle of 80° before the top dead center or before in the compression stroke.

5. The diesel engine according to claim 1, wherein the control device executes the pre-injection prior to the main injection only once.

6. The diesel engine according to claim 1, wherein the pre-injection is pilot injection.

7. The diesel engine according to claim 2, wherein
the fuel for the pre-injection is injected at the crank angle of 60° before the top dead center or before in the compression stroke.

8. The diesel engine according to claim 2, wherein
the fuel for the pre-injection is injected at the crank angle of 80° before the top dead center or before in the compression stroke.

\* \* \* \* \*